United States Patent
Liu et al.

(10) Patent No.: US 11,501,158 B2
(45) Date of Patent: Nov. 15, 2022

(54) APPARATUS AND METHODS FOR GENERATING RANDOM VECTORS

(71) Applicant: Cambricon (Xi'an) Semiconductor Co., Ltd., Xi'an (CN)

(72) Inventors: Daofu Liu, Beijing (CN); Xiao Zhang, Beijing (CN); Shaoli Liu, Beijing (CN); Tianshi Chen, Beijing (CN); Yunji Chen, Beijing (CN)

(73) Assignee: CAMBRICON (XI'AN) SEMICONDUCTOR CO., LTD., Xi'an (CN)

( * ) Notice: Subject to any disclaimer, the term of this patent is extended or adjusted under 35 U.S.C. 154(b) by 972 days.

(21) Appl. No.: 16/171,284

(22) Filed: Oct. 25, 2018

(65) Prior Publication Data

US 2019/0065952 A1 Feb. 28, 2019

Related U.S. Application Data

(63) Continuation-in-part of application No. PCT/CN2016/080970, filed on May 4, 2016.

(30) Foreign Application Priority Data

Apr. 26, 2016 (CN) .......................... 201610266608.8

(51) Int. Cl.
  *G06N 3/08* (2006.01)
  *G06F 9/30* (2018.01)
  *G06N 3/04* (2006.01)

(52) U.S. Cl.
  CPC .................. *G06N 3/08* (2013.01); *G06F 9/30* (2013.01); *G06N 3/0454* (2013.01)

(58) Field of Classification Search
  CPC .......... G06N 3/08; G06N 3/0454; G06F 9/30
  See application file for complete search history.

(56) References Cited

U.S. PATENT DOCUMENTS

| 6,931,400 B1* | 8/2005 | Indyk ................. G06F 16/2474 |
| 2014/0052674 A1* | 2/2014 | Aggarwal ............. G06N 20/00 706/12 |

(Continued)

FOREIGN PATENT DOCUMENTS

| CN | 101515301 A | 8/2009 |
| CN | 101515301 B | 8/2009 |

(Continued)

OTHER PUBLICATIONS

EP 16899899.5—Office Action, European Search Report dated Mar. 30, 2020, 3 pages.

(Continued)

*Primary Examiner* — David Bilodeau
(74) *Attorney, Agent, or Firm* — Getech Law LLC; Jun Ye (57) ABSTRACT

Aspects for vector operations in neural network are described herein. The aspects may include a controller unit configured to receive an instruction to generate a random vector that includes one or more elements. The instruction may include a predetermined distribution, a count of the elements, and an address of the random vector. The aspects may further include a computation module configured to generate the one or more elements, wherein the one or more elements are subject to the predetermined distribution.

32 Claims, 5 Drawing Sheets

(56) References Cited

U.S. PATENT DOCUMENTS

| | | | |
|---|---|---|---|
| 2018/0268283 A1* | 9/2018 | Gilad-Bachrach | G06N 5/003 |
| 2018/0373694 A1* | 12/2018 | Kulkarni | G06F 16/243 |
| 2019/0012581 A1* | 1/2019 | Honkala | G06N 3/0472 |

FOREIGN PATENT DOCUMENTS

| | | |
|---|---|---|
| CN | 102156637 A | 8/2011 |
| WO | WO 2017/185388 A1 | 11/2017 |

OTHER PUBLICATIONS

EP 16899899.5—Communication Pursuant to Article 94(3) EPC, dated Jun. 15, 2020, 5 pages.

EP 16899899.5—Response to Communication Pursuant to Article 94(3) EPC, filed Aug. 25, 2020, 28 pages.

CN 201610266608.8—Second Office Action, dated Jan. 22, 2020, 5 pages. (no English translation).

PCT/CN2016/080970—International Search Report, dated Feb. 8, 2017, 12 pages. (no English translation).

T. Chen, et al., "A Small-Footprint Accelerator for Large-Scale Neural Networks", ACM Transactions on Computer Systems, vol. 33, No. 2, Article 6, May 2015, 27 pages.

Z. Du, et al., "An Accelerator for High Efficient Vision Processing", IEEE Transactions on Computer-aided Design of Integrated Circuits and System, vol. 36, No. 2, Feb. 2017, pp. 227-240.

S. Liu, et al., "Cambricon: An Instruction Set Architecture for Neural Networks", 2016 ACM/IEEE 43rd Annual International Symposium on Computer Architecture, Oct. 12, 2016, pp. 393-405.

S. Zhang, et al., "Cambricon-X An Accelerator for Sparse Neural Networks", The 49th Annual IEEE/ACM International Symposium on Microarchitecture Article No. 20, Oct. 15, 2016, 12 pages.

Y. Chen, et al., "DaDianNao: A Machine-Learning Supercomputer", 2014 47th Annual IEEE/ACM International Symposium on Microarchitecture, Dec. 13, 2014, pp. 609-622.

T. Luo, et al., "DaDianNao: A Neural Network Supercomputer", IEEE Transaction on Computers, vol. 66, No. 1, Jan. 2017, pp. 73-88.

T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.

Y. Chen, et al., "DianNao Family: Energy-Efficient Hardware Accelerators for Machine Learning", Communications of the ACM, vol. 59, No. 11, Nov. 2016, pp. 105-112.

D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.

Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

Peter Alfke, "Efficient Shift Registers, LFSR Counters, and Long Pseudo-Random Sequence Generators", XAPP 052, Jul. 7, 1996 (Version 1.1), pp. 1-6.

George Marsaglia and Wai Wan Tsang, "The Zuggurat Method for Generating Random Variables", pp. 1-7.

"http://www.cnblogs.com/BitArt/archive/2012/12/22/2827005.html", Sep. 10, 2018.

201610266608.8—Office Action, dated Jun. 18, 2019, 11 pages. (no English translation).

* cited by examiner

APPARATUS AND METHODS FOR GENERATING RANDOM VECTORS

CROSS-REFERENCE TO RELATED APPLICATIONS

The present invention is a continuation-in-part of PCT Application No. PCT/CN2016/080970, filed on May 4, 2016, which claims priority to commonly owned CN Application No. 201610266608.8, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, random vectors may be generated frequently in deep learning processes in MMNs.

A known method to generate random vectors in a multilayer artificial neural network is to use a general-purpose processor. However, only one random number may be generated at a time causing lower efficiency when a large number of random numbers are needed for the neural network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for random vector generation in a neural network. The example apparatus may include a controller unit configured to receive an instruction to generate a random vector that includes one or more elements. The instruction may include a predetermined distribution, a count of the elements, and an address of the random vector. The example apparatus may further include a computation module configured to generate the one or more elements. The one or more elements may be subject to the predetermined distribution.

The example aspect may further include an example method for random vector generation in a neural network. The example method may include receiving, by a controller unit, an instruction to generate a random vector that includes one or more elements, wherein the instruction includes a predetermined distribution, a count of the elements, and an address of the random vector; and generating, by a computation module, the one or more elements, wherein the one or more elements are subject to the predetermined distribution.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A vector may refer to one or more values formatted in a one-dimensional data structure. The values included in a vector may be referred to as elements. The number of the elements in the vector may be referred to as a length of the vector. A vector that includes one or more random values may be referred to as a random vector.

Figure 1:
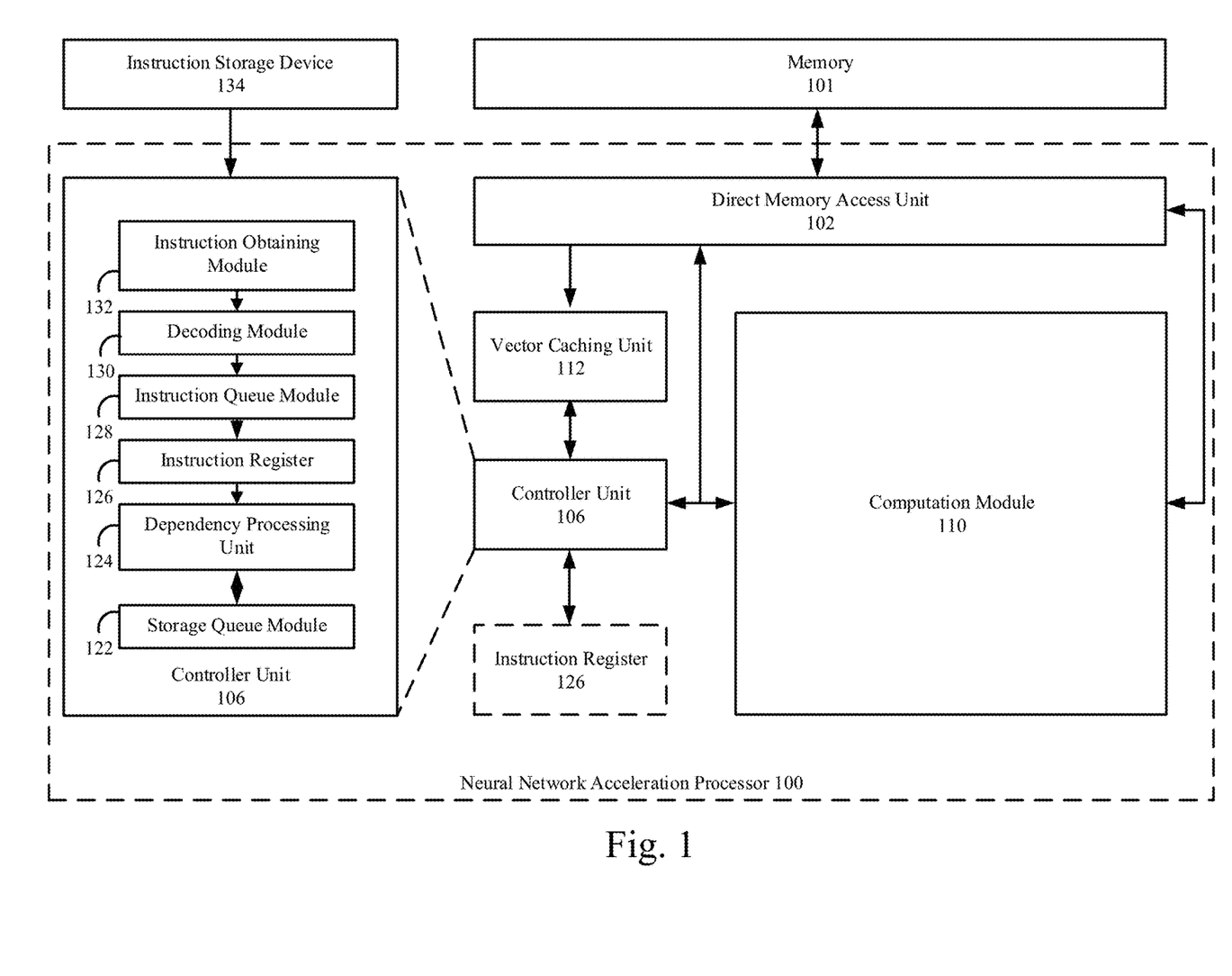
FIG. 1 illustrates a block diagram of an example neural network acceleration processor by which random vector generation may be implemented in a neural network.

FIG. 1 illustrates a block diagram of an example neural network acceleration processor by which random vector generation may be implemented in a neural network. As depicted, the example neural network acceleration processor 100 may include a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a random vector generation instruction may originate from an instruction storage device 134 to the controller unit 106. An instruction obtaining module 132 may be configured to obtain a random vector generation instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. For example, the information for a UNIF instruction may include a count of the elements, an address of the random vector, a minimum value of the elements, and a maximum value of the elements. The instruction register 126 may be further configured to store scalar values for the instruction. As depicted, in some examples, the instruction register 126 may be implemented by one or more registers external to the controller unit 106. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode various random vector generation instructions from the storage queue module 122.

For example, the controller unit 106 may receive a uniform-distribution (UNIF) instruction that instructs the computation module 110 to generate a random vector that includes random values subject to uniform distribution. The UNIF instruction may include operation fields such as a count of the elements, an address of the random vector, a minimum value of the elements, and a maximum value of the elements.

In some other examples, the controller unit 106 may receive a Gaussian-distribution (GAUS) instruction that instructs the computation module 110 to generate a random vector that includes random values subject to Gaussian distribution. The GAUS instruction may include operation fields such as a count of the elements, an address of the random vector, a mean of the elements, and a variance of the elements.

Hereinafter, a caching unit (e.g., the instruction register 126, the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Figure 2:
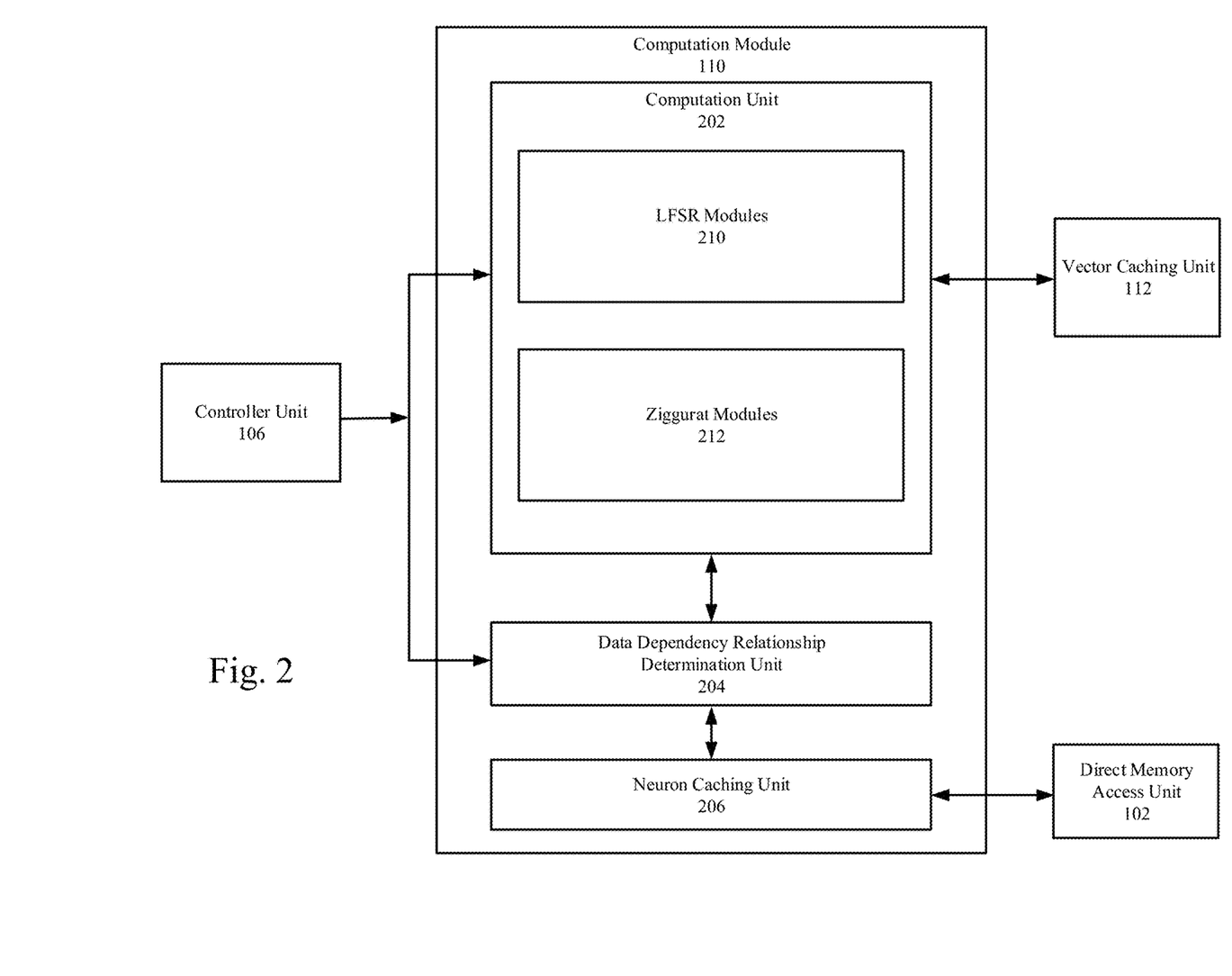
FIG. 2 illustrates an example computation module in the example neural network acceleration processor by which random vector generation may be implemented in a neural network.

FIG. 2 illustrates an example computation module in the example neural network acceleration processor by which random vector generation may be implemented in a neural network.

As depicted, the computation module 110 may include a computation unit 202, a data dependency relationship determination unit 204, a neuron caching unit 206. The computation unit 202 may further include one or more linear-feedback shift register (LFSR) modules 210, one or more Ziggurat modules 212, and a comparer 214. The components of the computation module 110 may be implemented as hardware, software, firmware, or any combination thereof.

The data dependency relationship determination unit 204 may be configured to perform data access operations (e.g., reading or writing operations) on the caching units including the neuron caching unit 206 during the computation process. The data dependency relationship determination unit 204 may be configured to prevent conflicts in reading and writing of the data in the caching units. For example, the data dependency relationship determination unit 204 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 204 may be stored in an instruction queue within the data dependency relationship determination unit 204. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 206 may be configured to store the values included in the instruction and random values generated by the computation unit 202.

The computation unit 202 may be configured to receive the micro-instructions decoded from the instruction. In the example that the computation unit 202 receives micro-instructions decoded from a UNIF instruction, the LFSR modules 210 may be configured to generate one or more random values subject to uniform distribution in accordance with the minimum value and the maximum value included in the UNIF instruction.

In some other examples, the computation unit 202 may receive micro-instructions decoded from a GAUS instruction. The Ziggurat modules 212 may be configured to generate one or random values subject to Gaussian distribution in accordance with the mean and the variance included in the GAUS instruction. The count of the random values may also be determined in accordance with the count of elements included in the instruction. The generated random values may be output in a form of vector.

Figure 3:
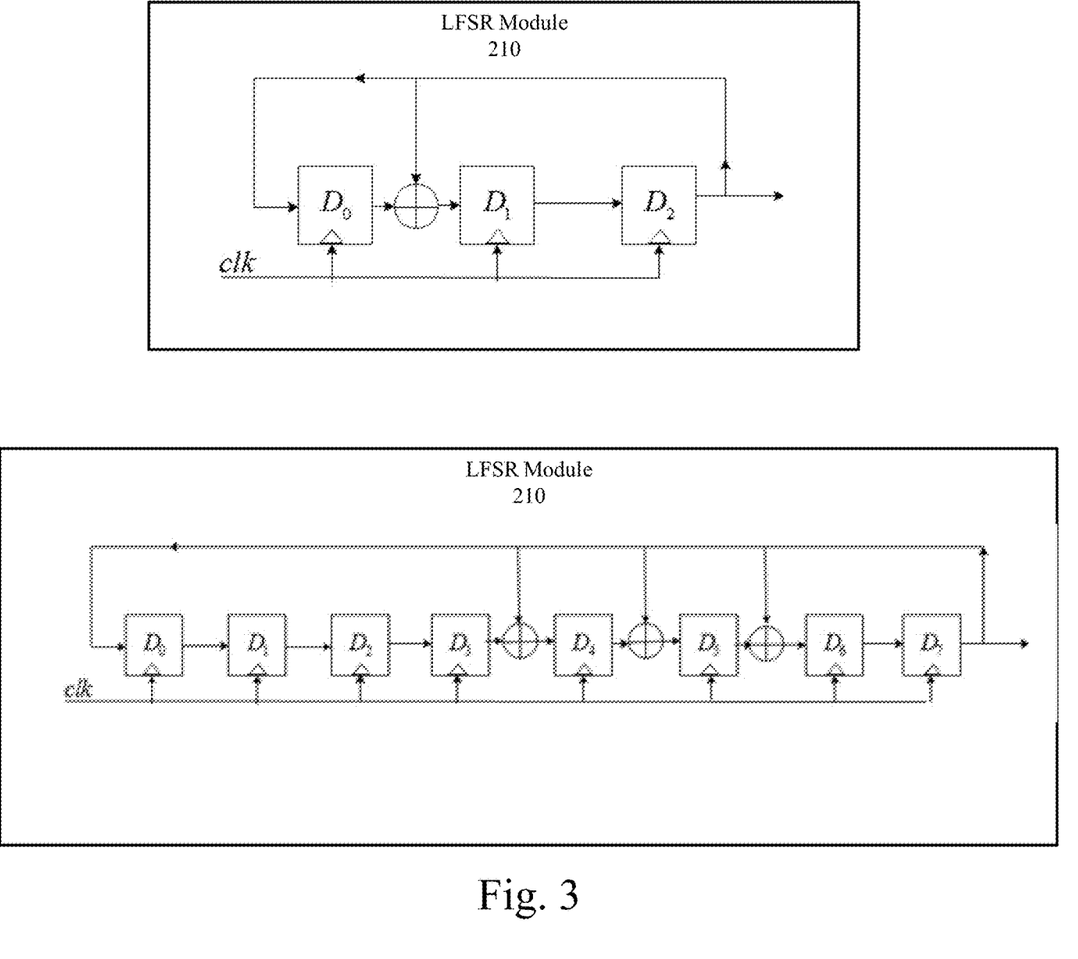
FIG. 3 illustrates example LFSR modules in the example neural network acceleration processor by which random vector generation may be implemented in a neural network.

FIG. 3 illustrates example LFSR modules in the example neural network acceleration processor by which random vector generation may be implemented in a neural network. As depicted, an example LFSR module 210 may include one or more D flip-flops and one or more exclusive-OR gates. Two consecutive D flip-flops may be connected directly or via an exclusive-OR gate. The output of the last D flip-flop (e.g., $D_2$ or $D_7$) may be a random value subject to uniform distribution in accordance with the minimum value and the maximum value included in the UNIF instruction. The output of the last D flip-flop may also be fed back to the first D flip-flop and to each of the exclusive-OR gates. FIG. 3 shows a first LFSR module 210 implemented with three D flip-flops and one exclusive-OR gate and a second LFSR module 210 implemented with eight D flip-flops and three exclusive-OR gates. An example LFSR module may be a member of Xilinx® family such as XC4000E, XC4000L, XC4000EX, XC4000XL, etc.

The LSFR modules may further include one or more multipliers configured to multiply the generated random values with an adjustable parameter such that, after the multiplication, the generated random values are within a range defined by the maximum value and the minimum value included in the UNIF instruction.

In some examples, the computation unit 202 may include multiple LFSR modules 210 such that the LFSR modules may be configured to parallelly generate multiple random numbers in each time slot. Similarly, the computation unit 202 may include multiple Ziggurat modules 212

Figure 4:
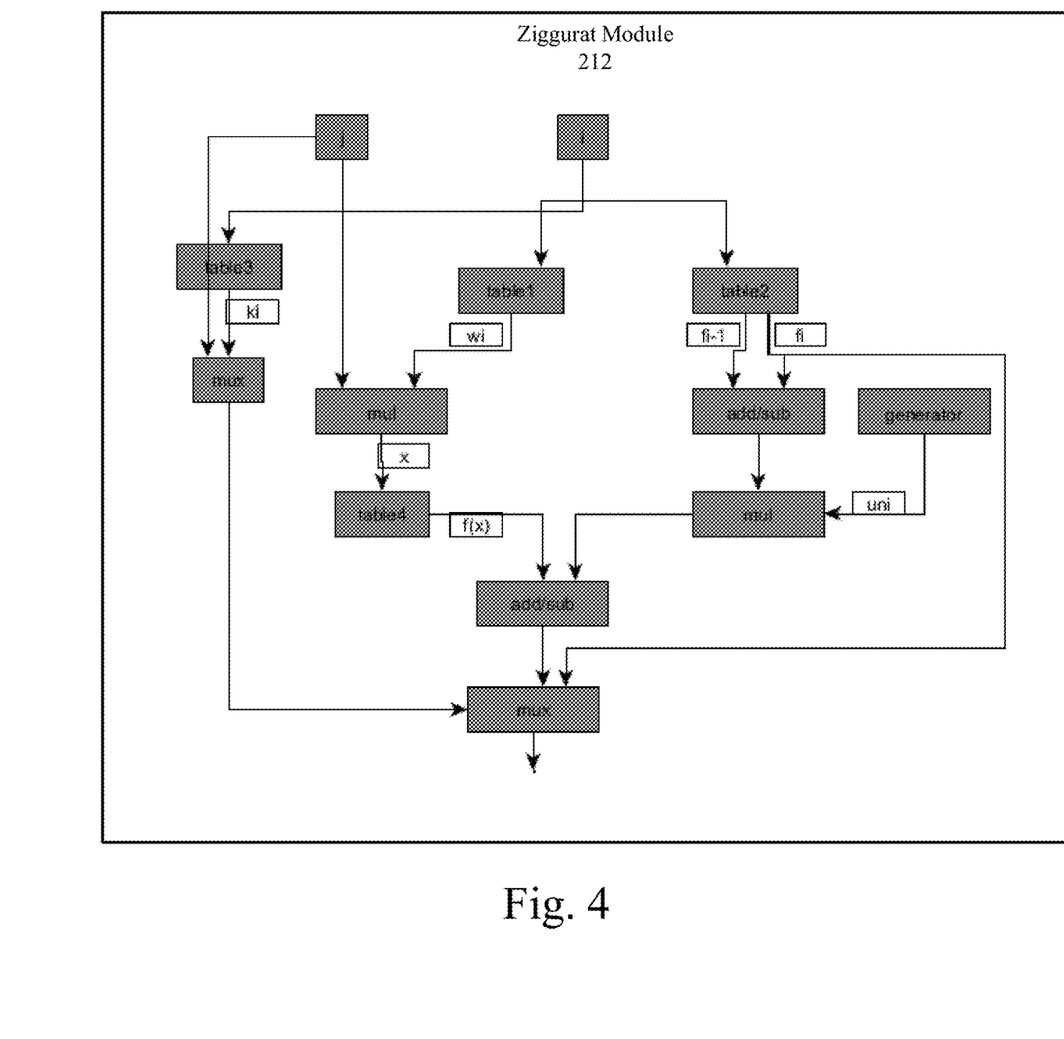
FIG. 4 illustrates an example Ziggurat module in the example neural network acceleration processor by which random vector generation may be implemented in a neural network.

FIG. 4 illustrates an example Ziggurat module in the example neural network acceleration processor by which random vector generation may be implemented in a neural network. As depicted, the example Ziggurat module 212 may receive one or more initial random values output by the LFSR module 210 and output a random value subject to Gaussian distribution in accordance with the mean and the variance included in the GAUS instruction. An example Ziggurat module is described in greater detail here. See *The Ziggurat Method for Generating Random Variables*, George Marsaglia, The Florida State Univeristy and Wai Wan Tsang, The University of Hong Kong.

Figure 5:
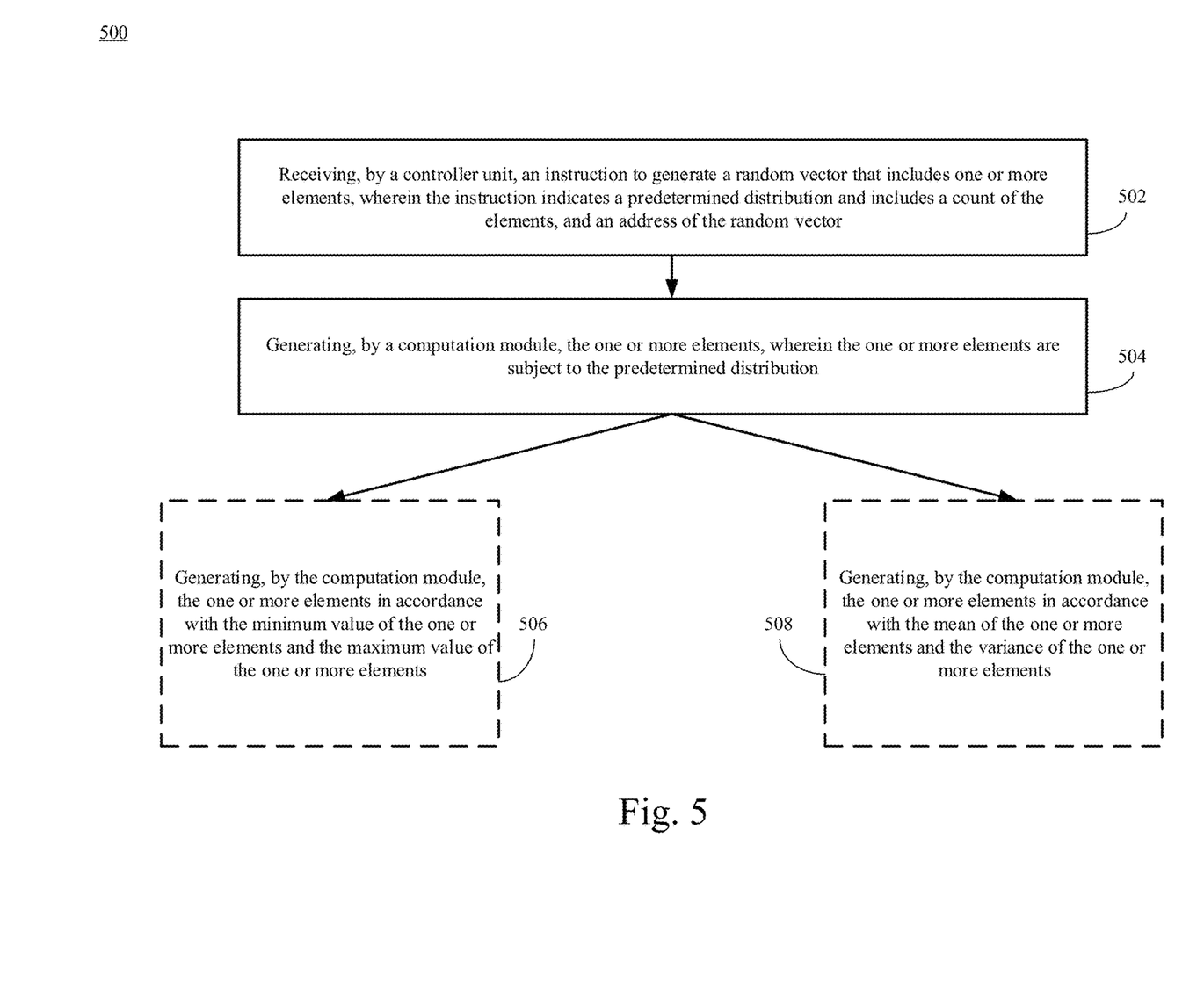
FIG. 5 illustrates a flow chart of an example method for generating a random vector in a neural network.

FIG. 5 illustrates a flow chart of an example method for generating a random vector in a neural network. The example method 500 may be performed by one or more components the apparatus of FIGS. 1-4. Optional or alternative operations may be shown in dash-lined blocks.

At block 502, the example method 500 may include receiving, by a controller unit, an instruction to generate a random vector that includes one or more elements. For example, the controller unit 106 may receive an instruction that instructs the computation module 110 to generate a random vector that includes one or more random values subject to a predetermined distribution. According to different instructions, the process may continue to block 506 or block 508.

At block 506, the example method 500 may include generating, by the computation module, the one or more elements in accordance with the minimum value of the one or more elements and the maximum value of the one or more elements. For example, the computation unit 202 may be configured to generate one or more random values subject to uniform distribution in accordance with the minimum value and the maximum value included in the UNIF instruction. The count of the random values may also be determined in accordance with the count of elements included in the instruction. The generated random values may be output in a form of vector.

At block 508, the example method 500 may include generating, by the computation module, the one or more elements in accordance with the mean of the one or more elements and the variance of the one or more elements. For example, the computation unit 202 may be configured to generate one or random values subject to Gaussian distribution in accordance with the mean and the variance included in the GAUS instruction. The count of the random values may also be determined in accordance with the count of elements included in the instruction. The generated random values may be output in a form of vector.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for random vector generation in a neural network, comprising:
    a controller unit configured to receive a random vector generation instruction to generate a random vector that includes one or more elements, wherein the instruction indicates a predetermined distribution and includes a count of the elements and an address of the random vector; and
    a computation module configured to generate, in response to the random vector generation instruction, the one or more elements, wherein the one or more elements are subject to the predetermined distribution.

2. The apparatus of claim 1, wherein the predetermined distribution is a uniform distribution and wherein the instruction further includes a minimum value and a maximum value of the one or more elements.

3. The apparatus of claim 2, further comprising one or more scalar registers configured to store a count of the elements, the address of the random vector, the minimum value of the one or more elements, and the maximum value of the one or more elements.

4. The apparatus of claim 3, wherein the computation module is configured to generate the one or more elements in accordance with the minimum value of the one or more elements and the maximum value of the one or more elements.

5. The apparatus of claim 4, wherein the computation module further includes one or more D flip-flops and one or more exclusive-OR gates,
    wherein the one or more D flip-flops are sequentially connected in a sequence, and
    wherein one of the one or more exclusive-OR gates is inserted between neighboring two of the one or more D flip-flops, and
    wherein an output of a last D flip-flop in the sequence is fed back to a first D flip-flop in the sequence.

6. The apparatus of claim 5, wherein the computation module further includes one or more multipliers configured to multiply the one or more elements with an adjustable parameter to generate one or more scaled elements such that the one or more scaled elements are within a data range defined by the minimum value and the maximum value.

7. The apparatus of claim 1, wherein the predetermined distribution is a Gaussian distribution and wherein the instruction further includes a mean and a variance of the one or more elements.

8. The apparatus of claim 7, further comprising one or more scalar registers configured to store a count of the elements, the address of the random vector, the mean of the one or more elements, and the variance of the one or more elements.

9. The apparatus of claim 8, wherein the computation module is configured to generate the one or more elements in accordance with the mean of the one or more elements and the variance of the one or more elements.

10. The apparatus of claim 1, further comprising a vector caching unit configured to store the generated one or more elements.

11. The apparatus of claim 1, wherein the controller unit comprises an instruction obtaining module configured to obtain the random vector generation instruction from an instruction storage device.

12. The apparatus of claim 11, wherein the controller unit further comprises a decoding module configured to decode the random vector generation instruction into one or more micro-instructions.

13. The apparatus of claim 12, wherein the controller unit further comprises an instruction queue module configured to temporarily store the random vector generation instruction and one or more previously received instructions, and retrieve information corresponding to operation fields in the random vector generation instruction.

14. The apparatus of claim 13, wherein the controller unit further comprises an instruction register configured to store the information corresponding to the operation fields in the random vector generation instruction.

15. The apparatus of claim 14, wherein the controller unit further comprises a dependency processing unit configured to determine whether the random vector generation instruction has a dependency relationship with the one or more previously received instructions.

16. The apparatus of claim 15, wherein the controller unit further comprises a storage queue module configured to store the random vector generation instruction while the dependency processing unit is determining whether the random vector generation instruction has the dependency relationship with the one or more previously received instructions.

17. A method for random vector generation in a neural network, comprising:
    receiving, by a controller unit, a random vector generation instruction to generate a random vector that includes one or more elements, wherein the instruction indicates a predetermined distribution and includes a count of the elements, and an address of the random vector; and
    generating, by a computation module in response to the random vector generation instruction, the one or more elements, wherein the one or more elements are subject to the predetermined distribution.

18. The method of claim 17, wherein the predetermined distribution is a uniform distribution and wherein the instruction further includes a minimum value and a maximum value of the one or more elements.

19. The method of claim 18, further comprising storing, by one or more scalar registers, a count of the elements, the address of the random vector, the minimum value of the one or more elements, and the maximum value of the one or more elements.

20. The method of claim 19, further comprising generating, by the computation module, the one or more elements in accordance with the minimum value of the one or more elements and the maximum value of the one or more elements.

21. The method of claim 19, further comprising generating, by the computation module, the one or more elements in accordance with the mean of the one or more elements and the variance of the one or more elements.

22. The method of claim 20, wherein the computation module further includes one or more D flip-flops and one or more exclusive-OR gates,
wherein the one or more D flip-flops are sequentially connected in a sequence, and
wherein one of the one or more exclusive-OR gates is inserted between neighboring two of the one or more D flip-flops, and
wherein an output of a last D flip-flop in the sequence is fed back to a first D flip-flop in the sequence.

23. The method of claim 22, further comprising multiplying, by one or more multipliers of the computation module, the one or more elements with an adjustable parameter to generate one or more scaled elements such that the one or more scaled elements are within a data range defined by the minimum value and the maximum value.

24. The method of claim 17, wherein the predetermined distribution is a Gaussian distribution and wherein the instruction further includes a mean and a variance of the one or more elements.

25. The method of claim 24, further comprising storing, by one or more scalar registers, a count of the elements, the address of the random vector, the mean of the one or more elements, and the variance of the one or more elements.

26. The method of claim 17, further comprising storing, by a vector caching unit, the generated one or more elements.

27. The method of claim 17, further comprising obtaining, by an instruction obtaining module of the controller unit, the random vector generation instruction from an instruction storage device.

28. The method of claim 27, further comprising decoding, by a decoding module of the controller unit, the random vector generation instruction into one or more micro-instructions.

29. The method of claim 28, further comprising temporarily storing, by an instruction queue module of the controller unit, the random vector generation instruction and one or more previously received instructions, and retrieve information corresponding to operation fields in the random vector generation instruction.

30. The method of claim 29, further comprising storing, by an instruction register of the controller unit, the information corresponding to the operation fields in the random vector generation instruction.

31. The method of claim 30, further comprising determining, by a dependency processing unit of the controller unit, whether the random vector generation instruction has a dependency relationship with the one or more previously received instructions.

32. The method of claim 31, further comprising storing, by a storage queue module of the controller unit, the random vector generation instruction while the dependency processing unit is determining whether the random vector generation instruction has the dependency relationship with the one or more previously received instructions.

* * * * *